United States Patent [19]

Hasegawa et al.

[11] 4,225,563
[45] Sep. 30, 1980

[54] PROCESS AND APPARATUS FOR CONTINUOUS LEACHING OF ORES

[75] Inventors: Shoichi Hasegawa, Tokyo; Thoru Yamashita, Yokohama; Mitsuo Kameda, Tokyo, all of Japan

[73] Assignee: International Resources Company, Ltd., Japan

[21] Appl. No.: 935,501

[22] Filed: Aug. 21, 1978

[30] Foreign Application Priority Data

Sep. 9, 1977 [JP] Japan .................................. 52-108488

[51] Int. Cl.$^2$ ........................ C01G 43/00; C01G 3/00; C01G 31/00; C01G 53/00
[52] U.S. Cl. ........................................ 423/20; 423/3; 423/17; 423/658.5; 423/1; 423/27; 423/68; 423/150; 75/101 R
[58] Field of Search .................. 423/1, 3, 20, 27, 658.5, 423/68, 150; 75/101 R

[56] References Cited

U.S. PATENT DOCUMENTS

| | | | |
|---|---|---|---|
| 3,777,004 | 12/1973 | Lankenau et al. | 423/20 |
| 4,017,309 | 4/1977 | Johnson | 75/101 R |
| 4,120,935 | 10/1978 | Fountain et al. | 75/101 R |

OTHER PUBLICATIONS

Marshall, "Nuclear Engineering International", Mar. 1977, pp. 66-68.
Leger et al., "World Mining", May 1974, pp. 40-42.
Smith et al., "The Chemical Engineer", Dec. 1972, pp. 440-444.
Takada et al., "IAEA-SM-135/14", pp. 97-110.
Sato et al., "Proceedings of 3rd International Conference on Peaceful Uses of Atomic Energy", United Nations, N.Y., 1965, vol. 12, pp. 222-230.

*Primary Examiner*—Herbert T. Carter
*Attorney, Agent, or Firm*—Jacobs & Jacobs

[57] ABSTRACT

A process for the continuous leaching of ores and an apparatus for practicing this continuous leaching process are disclosed. According to this process, a plurality of unit layers composed of a pulverized uranium ore or other ore are continuously laminated while a minimum necessary amount of an acid, alkali or organic solvent (hereinafter referred to as "solvent") is uniformly sprinkled on the flat surfaces of these unit layers. In the state where the concentration of the solvent mixed into the ore is maintained at a high level, the heat generated by exothermic reaction caused by contact among the solvent, ore and water is effectively stored and used for thermally curing the ore. According to this process, the speed of extraction of the intended metal component can be increased, the leaching time shortened and the filtration characteristics improved, whereby a highly concentrated pregnant liquor can be recovered at a high efficiency.

12 Claims, 4 Drawing Figures

PROCESS AND APPARATUS FOR CONTINUOUS LEACHING OF ORES

BACKGROUND OF THE INVENTION

(1) Field of the Invention

The present invention relates to a process and apparatus for continuously leaching and extracting metal components contained in ores. More particularly, the invention relates to a process for the continuous leaching of uranium ores and other ores for recovery of metal components contained in these ores, wherein a plurality of unit layers composed of a pulverized uranium ore or other ore are laminated while a minimum necessary amount of an acid, alkali or organic solvent (hereinafter referred to as "solvent") is uniformly sprinkled on the flat surfaces of these unit layers respectively, each unit layer having a specified thickness sufficient to attain uniform mixing of the ore with the solvent, and in the state where the concentration of the solvent mixed into the ore is maintained at a high level, the heat generated by exothermic reaction caused by contact among the solvent, ore and water is effectively stored and used for thermally curing the ore, whereby the speed of extraction of the intended metal component can be increased, the leaching time shortened, the filtration characteristics improved, with the result that a highly concentrated pregnant liquor can be recovered at a high efficiency. The present invention relates also to an apparatus for practising this continuous leaching process. Throughout the specification "unit layer" means a layer having a specified thickness determined as being a sufficient thickness for attaining uniform mixing of the ore with the solvent.

(2) Brief Description of the Prior Art

For recovery of metal components contained in uranium ores and other ores by a leaching treatment, there has generally been adopted a process in which an ore is leached at a normal temperature or under heating for a long period of time by using a low concentration acid or alkali solvent. According to this conventional process, however, the speed of reaction caused by contact between the metal component in the ore and the solvent is very low. Accordingly, when a relatively refractory ore, for example, a uranium ore, is treated according to this conventional technique, the uranium recovery rate is low and further, since a long period of time is required for completion of the leaching treatment, the equipment expense becomes tremendous. Therefore, this conventional process involves many technical and economical problems which are difficult to solve. For example, when a clay uranium ore is leached with a low concentration acid or alkali according to this conventional technique, silicates contained in the ore or clay come into contact with water or dilute acid, large quantities of various colloidal substances such as $SiO_2 \cdot xH_2O$, having a variety of structures are dissolved out and dispersed in the leaching system, and therefore, the rate of the uranium extraction is drastically reduced by the presence of these colloidal substances. Accordingly, the leaching treatment of a clay uranium ore by the conventional technique is not only extremely difficult but also leads to great difficulties in the solid-liquid separation to be conducted after the leaching treatment. This results in a serious defect, namely a drastic decrease in the uranium recovery rate.

Various leaching processes and apparatuses have heretofore been developed and proposed as means for solving the above-mentioned various problems involved in the conventional process. For example, Japanese Patent Publication No. 10302/63 proposes "PROCESS AND APPARATUS FOR CONTINUOUS LEACHING OF URANIUM ORES BY THERMAL FILTRATION", in which a solvent is sprinkled on a pulverized ore continuously fed on an endless rotating belt of a given width so that a thin layer having a predetermined thickness is formed on the endless belt, and the pressure is reduced beneath the belt which is in contact with the thin layer of the pulverized ore to attain the object of uniformly mixing the pulverized ore with the solvent. In this process, however, the thickness of the layer of pulverized ore capable of being provided on the belt is limited to that which permits uniform mixing between the solvent and ore, and further, the method of sprinkling the solvent, such as sulfuric acid, involves problems. Accordingly, this process is defective in that the treating capacity per unit cannot be increased and it is impossible to increase the sulfuric acid concentration above 400 g/l in the ore-sulfuric acid admixture. Further, in "Proceedings of the Third International Conference on the Peaceful Uses of Atomic Energy", volume 12, pages 226–227, there is published a report entitled "Uranium Resources and Recovery Process in Japan", which discloses a process for treating a clay uranium ore having a high clay content. In this process, it was intended to remove water from the clay (the target water content being below 10%). However, according to this process, it is difficult to reduce the water content below 20%. Hence, sulfuric acid becomes diluted and the subsequent solid-liquid separation is difficult. Still further, in IAEA-SM-135/14 of IAEA Symposium, Sao Paulo, August 1970, a pilot mill for practising the strong acid leaching process built at Ningyo-toge Mine, Okayama-ken, Japan is diagrammatically illustrated. In this apparatus, a pulverized ore and sulfuric acid fed from the upper portion of the supply end of a horizontal type puddle mixer are agitated by agitation blades rotated in the mixer, and while the mixture is moved from the supply end to the discharge end of the mixer in the agitated state (for about 15 to about 20 minutes), thermal curing of the ore is effected. Although it was intended to attain uniform mixing of the ore with sulfuric acid according to the above procedures, it was found that satisfactory results could not be obtained with this process. In addition, in IAEA-SM-135/21, there is published a report entitled "Some Recent Developments in Uranium Ore Processing Research in the United Kingdom", in which curing of uranium ores by high concentration sulfuric acid is discussed. According to the process disclosed in this report, however, satisfactory results cannot be obtained with respect to attainment of uniform mixing, and the sulfuric acid concentration in the acid-ore admixture cannot be increased over a value of 6 N. Still further, in "World Mining", May 1974, pages 40–42, a uranium processing plant at the Arlit Mill in Republic of Niger, Africa is introduced. This plant could also not sufficiently solve the problem at attainment of uniform mixing of a pulverized ore with sulfuric acid. It must also be noted that the dilution heat, described hereinafter, is not effectively utilized.

Even in the above-mentioned improved techniques, various problems such as described below are left unsolved.

When results of actual operations of leaching uranium ores with high concentration according to the improved conventional techniques are examined in detail, it is seen that an ore is pulverized to a particle size not larger than 800μ, the amount of sulfuric acid used is about 65 Kg-H$_2$SO$_4$/ton of the ore, and the mixing ratio of sulfuric acid necessary to attain uniform mixing between the ore and sulfuric acid is such that 100 to 150 l of a sulfuric acid solution is used per ton of the ore.

When the mixing ratio is lower than 100 l/ton, the sulfuric acid concentration in the sulfuric acid solution mixed with the ore is higher than 650 g/l. Accordingly, stronger leaching with higher concentration sulfuric acid beocmes possible. Further, in the case of a uranium ore containing clay or large quantities of silicates, the high concentration of sulfuric acid is advantageous in that the high concentration sulfuric acid fixes these silicates by dehydration, the solid-liquid separation after the leaching treatment being remarkably facilitated. However, uniform mixing of the ore with sulfuric acid lower than 100 l/ton becomes difficult, with resulting disadvantage that the uranium leaching rate is not increased but decreased.

When the above mixing ratio is higher than 150 l/ton, uniform mixing of the ore with sulfuric acid can be attained relatively easily, but since the sulfuric acid is diluted and the sulfuric acid concentration is reduced below 430 g/l, a long time is required for the leaching treatment and the uranium recovery rate decreases.

For the foregoing reasons, the above-mentioned mixing ratio is limited to within the range of 100 to 150 l/ton in the improved conventional techniques. However, the limitation of the mixing ratio to 100 to 150 l/ton is often a great obstacle to stable continuous operation. Specifically, when the mixing ratio is in such range, in many cases the ore exhibits maximum viscosity and easily adheres to the mixer or the inner wall of the curing apparatus so that the flowing of the ore in the apparatus is inhibited. Furthermore, since the mixing ratio of 100 to 150 l/ton corresponds to a sulfuric acid concentration of 650 to 430 g/l in the sulfuric acid solution, severe corrosion due to the acid takes place in the mixer or curing apparatus. Therefore, the adoption of expensive corrosion-resistant materials and the maintenance and repair of the leaching equipment becomes a heavy financial burden.

Furthermore, the majority of the heat generated in the leaching process is wasted in the improved conventional strong acid leaching process. Accordingly, the shortage of heat corresponding to the difference between the heat necessary for the thermal curing of the ore and the heat generated by dilution of sulfuric acid is made up for by preheating the ore or by using an auxiliary heat source. In short, one of the problems to be solved is that the heat generated by dilution of concentrated sulfuric acid with water contained in the ore and the heat generated by the reaction are not utilized in a sufficiently effective manner.

When an ore having a high lime content is leached with sulfuric acid, it is said that the allowable calcium carbonate content is 5 to 6% at highest. Accordingly, an alkali leaching process using sodium carbonate or the like is ordinarily adopted for ores having a high lime content. This process, however, is defective in that both the equipment capital cost and the operating cost becomes tremendous.

BRIEF SUMMARY OF THE INVENTION

We have conducted various investigations with a view to developing an effective leaching process and apparatus in which the foregoing various defects and disadvantages involved in the conventional processes and apparatuses can be eliminated, and found that if a predetermined amount of an extraction solvent is continuously sprinkled on the surface of each unit layer, at the step where a plurality of continuous unit layers having a specified thickness are continuously formed from a pulverized ore and these unit layers are laminated in many stages, very uniform mixing of the ore with the solvent can be attained. Based on this finding, we have now perfected the present invention. According to the process of the present invention, unit layers of a thickness which allows uniform mixing of the ore with the solvent are formed and they are laminated continuously and statically to whatever thickness is desired. Therefore, if required, a large quantity of the ore, that is, a large number of unit layers or ore, can be uniformly mixed with the solvent by the use of a simple apparatus and uranium or other metal contained in the ore can be continuously extracted at a high efficiency. The process of the present invention characterized in that unit layers composed of a pulverized ore and a solvent are formed and are laminated in many stages is a novel leaching process that has not heretofore been attempted.

According to the process of the present invention, even if the solvent-to-ore mixing ratio is lower than the 100 l/ton ratio that is a critical value for uniform mixing of the ore with the solvent in the conventional techniques, the fact that it is possible to determine the unit layer thickness necessary for attaining uniform mixing while the concentration of the solvent mixed with the ore is maintained at a high level makes it possible to effectively store and use the reaction heat for the thermal curing of the ore by laminating these unit layers. Accordingly, the speed of extracting uranium or other metal is remarkably increased and the solid-liquid separation after the leaching treatment greatly improved. Therefore, a high concentration pregnant liquor can be recovered at a high rate in a very short leaching time according to a simple filtration method.

Not only can the problems involved in the conventional techniques be easily solved according to the process of the present invention, but various additional advantages can be obtained. For example, since the process of the present invention is a static and continuous process in which uniform mixing is attained without particularly using a mechanical power and since the treatment is conducted continuously, it is possible to treat a large quantity of the laminated ore without limitation on the thickness of the laminated mass of ore. And as pointed out above, the reaction heat can be stored and utilized effectively for the thermal curing of the ore by lamination of the ore per se.

In the following description, the process of the present invention is often called the laminated acid (or alkali) cure leaching process (hereinafter also referred to as "LACL process") when it is necessary to distinguish the process of the present invention from the conventional leaching process using a low concentration solvent or the improved conventional leaching process using a high concentration solvent.

DETAILED DESCRIPTION OF THE INVENTION

An embodiment of the process for the leaching treatment of a uranium ore according to the present invention will now be described with reference to the accompanying drawings.

Figure 1:
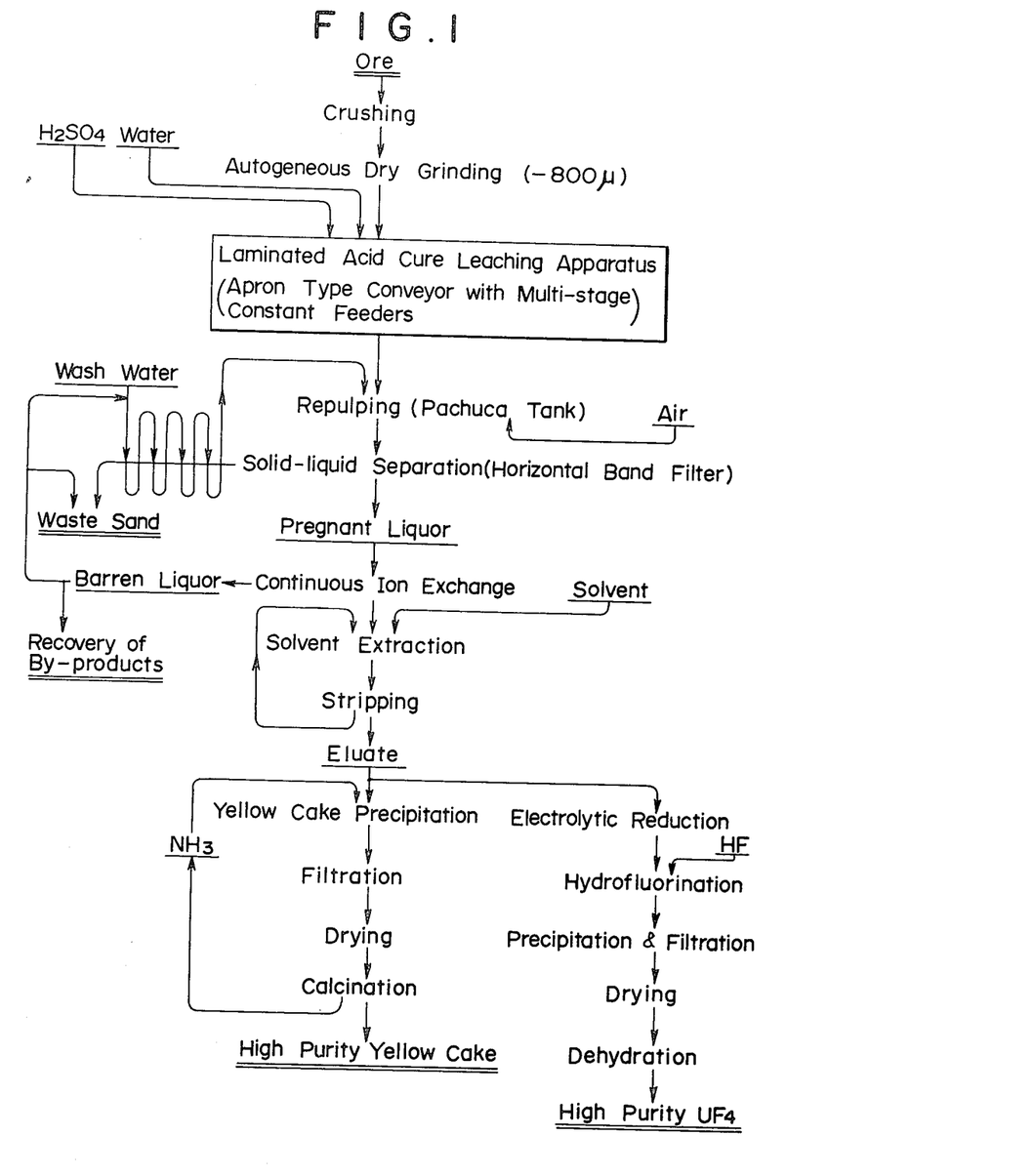
FIG. 1 is a flow sheet illustrating an embodiment of the process for the leaching treatment of a uranium ore according to the present invention.
Figure 2:
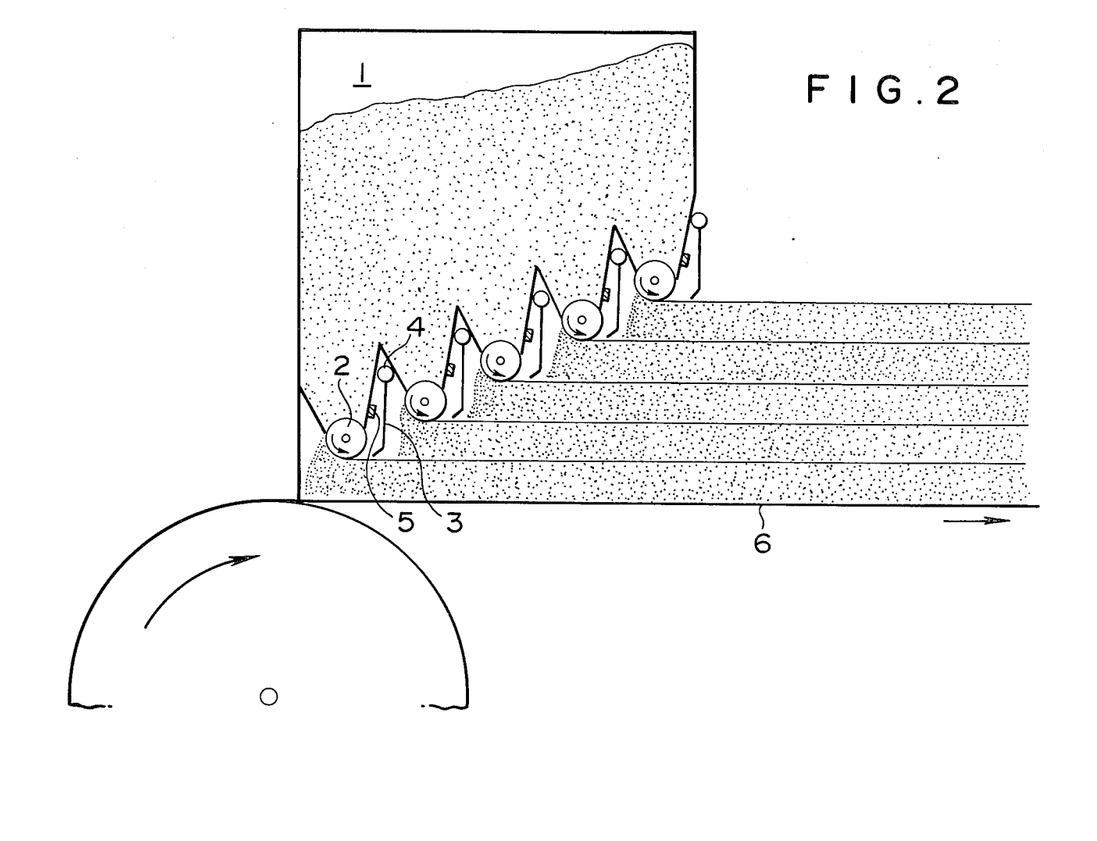
FIG. 2 is a diagram illustrating an instance of the apparatus for use in practising the process of the present invention.
Figure 3:
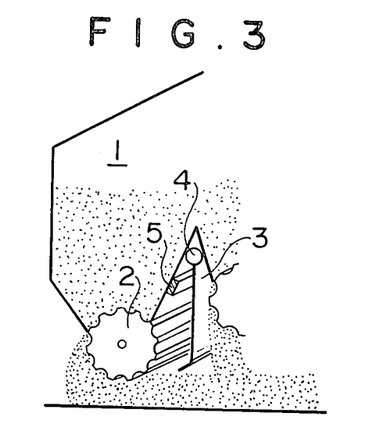
FIGS. 3 and 4 are diagrams showing parts of the apparatus illustrated in FIG. 2.
Figure 4:
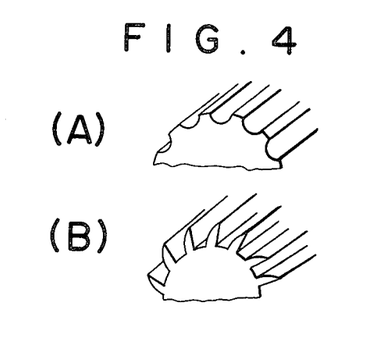

FIG. 1 is a flow sheet showing the laminated acid (or alkaline) cure leaching process of the present invention as one embodiment of the leaching treatment of a uranium ore. (It should be noted that the present invention includes not only the leaching step but also the step of recovery of a pregnant liquor). FIG. 2 is a diagram illustrating an instance of the apparatus for use in practising this LACL process. Reference numeral 1 represents a hopper, 2 represents a rotary feeder, 3 and overflow dipper plate, and 4 a pipe for sprinkling concentrated sulfuric acid. An electromagnetic vibrator 5 is disposed to cause a pulverized ore adhering to the inner wall of the lower portion of the hopper 1 to fall down by vibrating the inner wall. Reference numeral 6 represents a conveyor. (Incidentally, only one set of the reference numerals, 2, 3, 4 and 5 are employed in the drawing). FIG. 3 is a perspective view illustrating one set of the members 2, 3, 4 and 5 in relative detail, and FIG. 4 is a diagram illustrating an instance of the groove formed on the surface of the rotary feeder 2 to feed a predetermined amount of a pulverized ore.

An ore which has been dry-pulverized to an appropriate particle size or an ore which has been wet-pulverized to an appropriate particle size and from which water has been removed to an appropriate water content is first stored in the hopper 1 adapted to feed the ore to the apparatus shown in FIG. 2. According to need, the hopper 1 is equipped with a device for adding an oxidant, an ore preheater or a device for adjusting the water content of the ore (not shown). A necessary number of stages (5 stages in FIG. 2) of continuous feed type rotary feeders 2 are disposed as a multi-staged metering feeder in the bottom portion of the hopper 1. These feeders 2 are operated to form unit layers in stages in the apparatus shown in FIG. 2 (apron feeder type apparatus) and these unit layers are laminated at predetermined intervals. The thickness of the unit layer necessary for attaining uniform mixing varies greatly depending on various conditions adopted for the leaching treatment. Accordingly, this thickness is determined for the respective conditions. However, in general, the thickness is selected within a range of from about 1 to about 20 cm, except in special cases. For the rotary feeder 2 of each stage, a concentrated sulfuric acid sprinkling device is disposed in the intermediate position of the rotary feeder 2. This sprinkling device is arranged so that overflow is made uniform by a number of holes or grooves formed on the side face or by a constant pressure float kept afloat on the liquid level. For example, this device comprises a horizontally laid pipe 4 for sprinkling concentrated sulfuric acid and an overflow dipper plates. Concentrated sulfuric acid caused to flow out of the pipe 4 by a fixed delivery pump or fixed pressure pump is transmitted to the overflow dipper plate 3 to form a unit layer on the plate 3. The concentrated sulfuric acid thus flows down and sprinkles on the ore. The sprinkling device uniformly sprinles the sulfuric acid on a certain unit layer of the ore fed in a predetermined amount by means of the rotary feeder 2, and a unit layer of the ore fed by the rotary feeder 2 of the upper stage and having the same thickness, on which concentrated sulfuric acid has been similarly sprinkled, is laminated on the first-mentioned unit layer of the ore. Since the rotary feeder 2 is arranged so that it is co-operative with the concentrated sulfuric acid sprinkling device, with advancing movement of the conveyor 6 of the first stage as shown in the drawing, the first layer is located on the belt and second and each subsequent layer is laminated on the preceding layer. In this manner, there is obtained a laminated structure including a desired number of unit layers, namely a number of layers corresponding to the number of rotary feeders 2, the unit layers being composed of a homogeneous mixture of the ore and sulfuric acid. This laminated structure is advanced in a direction indicated by an allow and fed to the subsequent repulping step. During this period, thermal curing of the homogeneous mixture of the ore and concentrated sulfuric acid is performed. The curing time varies widely according to the kind of ore and other conditions, but in general, the curing time is adjusted to about 10 minutes to 3 hours. As shown in FIG. 1, solidliquid separation after repulping is carried out by means of a filter followed by counter-current washing, and finally the pregnant liquor is recovered and the waste sand is discarded.

The sulfuric acid-to-ore mixing ratio is determined in view of the operation conditions. One of the characteristic features of the present invention is that even if the mixing ratio is very low (for example, 80 l/ton of the ore or lower), uniform mixing is possible and hence, thermal curing can be performed while maintaining the concentration of the solvent mixed into the ore at a high level. By virtue of this characteristic feature, the speed of extracting uranium or other metal can be increased and the adaptability to solid-liquid separation after the leaching step remarkably improved. Therefore, the leaching time can be shortened and a high-concentration pregnant liquor can be obtained at a high recovery ratio by a simple filtration method. This is a great advantage attained by the present invention.

From calculations it has been confirmed that the process of the present invention can be applied with economical advantages even to ores having a high lime content. In general, in sulfuric acid leaching of a uranium ore having a high lime content, $SO_4^{--}$ is additionally consumed because of the presence of $Ca^{++}$, and therefore, it is said that the allowable upper limit of calcium carbonate is 5 to 6%. Accordingly, an alkali leaching process using sodium carbonate or the like is considered to be advantageous for leaching of an ore having a higher lime content. From calculations it has been confirmed that according to the present invention, sulfuric acid leaching is advantageous even if the calcium carbonate content is as high as about 14%. In this case, addition of excessive concentrated sulfuric acid contributes to thermal curing of ores by the heat generated by dilution and the heat ($-\Delta H$) generated by the exothermic reaction between sulfuric acid and calcium carbonate, which is represented as follows:

$$CaCO_3 + H_2SO_4 \rightarrow CaSO_4 \downarrow + CO_2 \uparrow + H_2O - \Delta H$$

Another characteristic of the present invention is that the heat generated by the hydration reaction between water contained in the ore and concentrated sulfuric acid can be effectively utilized.

The dilution heat generated when concentrated acid is added in an amount of 158 Kg/ton of the ore (nearly equal to 1600 mol of $H_2SO_4$ per ton of the ore) to an ore having a water content of 3.7% (37 kg of $H_2O$ per ton of the ore $\approx$ 2000 mol of $H_2O$ per ton of the ore) is calculated as 28,480 Kcal/ton of the ore as shown below.

Example of Calculation $\Delta H = 17.8$ Kcal/mol-$H_2SO_4$ (in 200 mol of water)

2000 mol-$H_2O$/ton of the ore + 1600 mol-$H_2SO_4$ (concentrated sulfuric acid)

In the case where 1 ton of the ore is divided into 10 layers, the water content is 200 mol-$H_2O$, and maximum dilution heat of 17.8 Kcal/mol-$H_2SO_4$ is obtained.

Therefore, the total calorific value is calculated as follows:

of the charged ore and sulfuric acid before mixing according to the formula $\sigma_o^2 = \overline{X}(1-\overline{X})$, $\sigma_s$ stands for the normal declination at the mixing step, which is calculated according to the formual $$\sigma_s^2 = \frac{1}{n}\Sigma_{i=1}^n (Xi - \overline{X})^2,$$

Xi stands for the concentration of the target component of a spot sample randomly sampled from the mixer, $\overline{X}$ stands for the average concentration attained when mixing is completely conducted, n stands for the number of spot samples, $\sigma_s^2$ stands for the dispersion under conditions of Xi, $\overline{X}$ and n, and $\sigma_s$ stands for the normal declination. Results of the measurement of the Ms values (%) are shown in Table 1.

Table 1

| | Conventional Strong Acid Leaching Process | | | | LACL Process of Present Invention | | | | |
|---|---|---|---|---|---|---|---|---|---|
| Sample No. | Xi $H_2SO_4$g/g-ore | $\overline{X}$ | (Xi-$\overline{X}$) | (Xi-$\overline{X}$)$^2$ | Sample No. | Xi $H_2SO_4$g/g-ore | $\overline{X}$ | (Xi-$\overline{X}$) | (Xi-$\overline{X}$)$^2$ |
| 1 | 0.1412 | 0.0650 | 0.0762 | 0.0058 | 1 | 0.145 | 0.126 | 0.019 | 0.00036 |
| 2 | 0.2531 | " | 0.1881 | 0.0354 | 2 | 0.140 | " | 0.014 | 0.00020 |
| 3 | 0.0023 | " | −0.0627 | 0.0039 | 3 | 0.092 | " | −0.034 | 0.00116 |
| 4 | 0.1625 | " | 0.0975 | 0.0095 | 4 | 0.151 | " | 0.025 | 0.00063 |
| 5 | 0.0029 | " | −0.0633 | 0.0040 | 5 | 0.131 | " | 0.005 | 0.00003 |
| 6 | 0.0093 | " | −0.0557 | 0.0031 | 6 | 0.142 | " | 0.016 | 0.00026 |
| 7 | 0.0166 | " | −0.0484 | 0.0023 | 7 | 0.123 | " | −0.003 | 0.00001 |
| 8 | 0.1940 | " | 0.1290 | 0.0166 | 8 | 0.143 | " | 0.017 | 0.00029 |
| 9 | 0.0060 | " | −0.0590 | 0.0035 | 9 | 0.131 | " | −0.005 | 0.00003 |
| 10 | 0.0142 | " | −0.0508 | 0.0026 | 10 | 0.113 | " | −0.013 | 0.00017 |
| Mixing Index (Ms%) | $\Sigma_{i=1}^n = 0.0867$ | | | | Mixing Index (Ms%) | $\Sigma_{i=1}^n = 0.00314$ | | | |
| | $\sigma_s^2 = \frac{1}{n}\Sigma_{i=1}^n = 0.00867$ | | | | | $\sigma_s^2 = \frac{1}{n}\Sigma_{i=1}^n = 0.000314$ | | | |
| | $\sigma_s = 0.0931$ | | | | | $\sigma_s = 0.0177$ | | | |
| | $\sigma_o^2 = \overline{X}(1-\overline{X}) = 0.0608$ | | | | | $\sigma_o^2 = \overline{X}(1-\overline{X}) = 0.110$ | | | |
| | $\sigma_o = 0.2466$ | | | | | $\sigma_o = 0.332$ | | | |
| | Ms(%) = $(1 - \frac{0.0931}{0.2466}) \times 100 = 62.2$ | | | | | Ms(%) = $(1 - \frac{0.0177}{0.332}) \times 100 = 94.7$ | | | |

---

Total calorific value = 17.8 Kcal × 1600 mol-$H_2SO_4$
= 28.480 Kcal/ton of the ore

---

Assuming that the specific heat of the ore is about 200 Kcal/ton of the ore, theoretically speaking, the above total calorific value corresponds to a temperature elevation of about 140° C./ton of the ore. Since this hydration reaction heat is effectively stored by lamination of continuous unit layers of the ore per se, almost no additional heat need be supplied from the outside; if only the starting ore is slightly preheated, curing at a temperature of about up to about 120° C. can be performed. Therefore, the apparatus can be remarkably simplified and great economical advantages attained.

We mixed a pulverized ore having a size not larger than 420μ with concentrated sulfuric acid at various mixing ratios, and the degree of mixing was determined in terms of the Lacey mixing index Ms (%) according to variance analysis and the relation between the mixing index Ms (%) and the uranium recovery rate was examined. The mixing index Ms is prepresented by the following formula:

Ms (%) = $(1 - \sigma_s/\sigma_o) \times 100$ wherein Ms stands for the mixing index expressed in terms of %, $\sigma_o$ stands for the normal declination at complete dispersion, which is calculated from the ratio As will be apparent from the foregoing illustration, the present invention is characterized in that unit layers composed of a uniform mixture of a pulverized ore and a solvent are formed and laminated in many stages and thermal curing is effected while the reaction heat is effectively stored by this lamination. In the foregoing embodiment, the moving system is used for transportation of the pulverized ore. Needless to say, in practising the present invention, there may be adopted a modification in which a fixed bed is used instead of this moving transportation system and the pulverized ore feed device is arranged so that it is moved.

The process and apparatus have been illustrated mainly by reference to the leachnig treatment of uranium ores. When an extraction solvent is appropriately chosen from inorganic acids such as sulfuric acid, hydrochloric acid, nitric acid and phosphoric acid, organic acids, alkali solvents such as sodium carbonate, ammonium carbonate and ammonia and organic solvents such as amines, the present invention can be broadly applied to extraction of effective metal components from not only uranium ores but also non-ferrous metal ores such as nickel ores, copper ores and vanadium ores. Further, the present invention can be effectively utilized for recovery of uranium from slag formed in the process of smelting gold or copper ores, recovery of uranium from phosphate rocks and processing of low-grade uranium ores.

lamination) and the conventional strong acid leaching process are shown in Table 2.

Table 2

| conditions | Conventional Strong Acid Leaching Process | LACL Process of Present Invention | |
|---|---|---|---|
| Ore | 400 g | 400 g | 951 g |
| Particle Size | $-420\mu$ | $-420\mu$ | $-420\mu$ |
| Grade | | | |
| $U_3O_8$ (%) | 0.134 | 0.134 | 0.215 |
| Cu (%) | 0.078 | 0.078 | 0.095 |
| V (%) | 0.074 | 0.074 | 0.097 |
| Fe (%) | 1.435 | 1.435 | 0.650 |
| $CaCO_3$ (%) | 10.3 | 10.3 | 14.1 |
| $H_2O$(%) | 3.7(37 Kg - $H_2O$/t - ore) | 3.7(37 Kg - $H_2O$/t - ore) | 3.5(35 Kg - $H_2O$/t - ore) |
| Oxidant ($NH_4NO_3$) | 5 Kg/t - ore | 5 Kg/t - ore | 5 Kg/t - ore |
| Amount of Sulfuric Acid added (S.G. 1.840) | 158 Kg/t - ore[*1] | 158 Kg/t - ore[*2] | 196 Kg/t - ore[*3] |
| Sulfuric Acid/Ore | (85.9 l/t - ore) | (85.9 l/t - ore) | (106.5 l/t - ore) |
| Mixing method | Conventional mixing method | Sulfuric acid uniformly sprinkled on respective unit layers | Sulfuric acid uniformly sprinkled on respective unit layers |
| Mixing ratio | 122.9 l/t - ore | 122.9 l/t - ore | 141.5 l/t - ore |
| Concentration of mixed sulfuric acid | 1,286g/l (76%$H_2SO_4$) | 1,286g/l (76% $H_2SO_4$) | 1,385g/l (79% $H_2SO_4$) |
| Uniform Mixing Index (Ms%)[*4] | 62.2 | 96.6 | 94.7 |
| Thermal Curing[*5] | 3 hours (120° C.) | 3 hours (120° C.) | 3 hours (120° C.) |
| Repulping (50° C.) | Ore : Water = 50 : 50 | Ore : Water = 50 : 50 | Ore : Water = 50 : 50 |
| Solid-Liquid Separation | Horizontal Filtration | Horizontal Filtration | Horizontal Filtration |
| Recovery Rate | $U_3O_8$  Cu  V  Fe | $U_3O_8$  Cu  V  Fe | $U_3O_8$  Cu  V  Fe |
| Analyzed Head grade (%) | 0.134  0.078  0.074  1.435 | 0.134  0.078  0.074  1.435 | 0.215  0.095  0.097  0.650 |
| amount(mg) | 536  312  296  5,740 | 536  312  296  5,740 | 2,045  903  922  6,182 |
| Pregnant Liquor amount (mg) | 470  310  182  1,521 | 535  289  190  1,741 | 2,010  853  582  2,554 |
| Leaching Rate (%) | 87.7  99.4  61.5  26.5 | 99.8  92.6  64.2  30.3 | 98.3  94.5  63.1  41.3 |

Note
[*1], [*2], [*3]In addition to 55 kg-$H_2SO_4$/t-ore for leaching of uranium (free $SO_4^{--}$ being 10 g/l after leaching), 103 kg/t-ore as amount consumed by $CaCO_3$([*1] and [*2]) or 141 kg/t-ore as amount consumed by $CaCO_3$([*3]) was added.
[*4]The mixing index Ms (%) was Lacey's mixing index described above.
[*5][dilution heat, $-\Delta H$= 17.8 Kcal/mol-$H_2SO_4$(in 200 moles of water]. In the above experiments, because of an insufficient insulating effect, the observed value of temperature increase was only about 70° C.

The present invention will now be described in detail with reference to the following Examples that are illustrative of the invention but which by no means limit the scope of the invention.

EXAMPLE 1

Results of experiments in which uranium ores were processed according to the LACL process (5 layers lamination) and the conventional strong acid leaching process are shown in Table 2.

EXAMPLE 2

Results of experiments where a uranium ore different from those used in Example 1 was treated according to the LACL process (5 unit layers of lamination) of the present invention and the conventional low concentration acid leaching process are shown in Table 3.

Table 3

| Conditions | Conventional Low Concentration Acid Leaching Process | LACL Process of Present Invention |
|---|---|---|
| Ore | 400 g | 400 g |
| Particle size ($\mu$) | $-600 + 63$ | $-600 + 63$ |
| Grade | | |
| $U_3O_3$ (%) | 0.133 | 0.133 |
| $CaCO_3$ (%) | 2.29 | 2.29 |
| Content $U_3O_8$ (mg) | 452 | 452 |
| Oxidant ($NH_4NO_3$) | 5 Kg/t - ore | 5 Kg/t - ore |
| Water | 956.5l/t - ore | 36.5l/t - ore |
| Amount of Sulfuric Acid added | 80 Kg/t - ore (43.5l/t - ore) | 80 Kg/t - ore (43.5l/t - ore) |
| Sulfuric Acid/Ore Mixing method | Repulping by agitation | Sprinkled uniformly on respective unit layers |
| Mixing ratio | 100 l/t - ore | 80 l/t - ore |
| Concentration of mixed sulfuric acid | 80 g/l | 1,000 g/l |
| Leaching Method | Agitation | LACL process |
| Time | 24 hours | 3 hours (thermal curing) |
| Temperature | 50° C. | 120° C. |
| Solid-Liquid Separation | Horizontal Filtration (4-staged counter-current decantation) | Horizontal Filtration (4-staged counter-current decantation) |
| Pregnant Liquor ($U_3O_8$-mg) | 370 | 440 |

Table 3-continued

| Conditions | Conventional Low Concentration Acid Leaching Process | LACL Process of Present Invention |
|---|---|---|
| Residue (U₃O₈ %) | 386g × 0.027% = 104mg-U₃O₈ | 379g × 0.007% = 26mg-U₃O₈ |
| Calculated head(U₃O₈-mg) | 474 | 466 |
| Analyzed head (U₃O₈-mg) | 452 | 452 |
| Recovery Rate Pregnant Liquor/Analyzed Head | 81.9% | 97.3% |
| Pregnant Liquor/Calculated Head | 78.1% | 94.4% |

Advantages of the present invention are summarized as follows.

(1) In the process of the present invention, the leaching is accomplished in a much shorter time (10 minutes to 3 hours depending on ore properties) than in the conventional leaching processes, and a higher uranium extraction rate can be attained. Accordingly, both equipment and running costs can be remarkably reduced.

(2) The process of the present invention is very effective for extraction of uranium from not only ordinary uranium ores but also refractory uranium ores, clay uranium ores and high lime content uranium ores, and the solid-liquid separation after the leaching can be remarkably facilitated. Accordingly, a highly concentrated uranium pregnant liquor can be recovered at a high efficiency by a simple filtration method.

(3) In the process of the present invention, even if the mixing ratio of sulfuric acid to the ore is very low (100 l/ton of the ore or lower), a highly uniform mixing index ($M_s$=about 95%) can be attained and substantially complete uniform mixing can be obtained. Further, the concentration of sulfuric acid after lamination mixing is as high as about 1,300 g/l (78% $H_2SO_4$) and a sufficient curing effect can be attained. Therefore, a uranium leaching rate of 98 to 99% can be attained by conducting the LACL Process of this invention for a period as short as 10 minutes to 3 hours depending on ore properties.

(4) The concentration of sulfuric acid uniformly mixed into laminated unit layers is higher than 70% $H_2SO_4$. Accordingly, a special corrosion-resistant material need not be used.

(5) According to the process of the present invention, thermal curing can be accomplished (in 10 minutes to 3 hours at about 90° to about 120° C.) while effectively storing and utilizing the dilution heat and reaction heat by lamination of layers of the ore per se. Accordingly, even if the amount of sulfuric acid added is small, the intended effects can be attained only by slight preheating of the ore. In other words, fuel consumption can be remarkably reduced by effective utilization of the heat.

(6) In the process of the present invention, the ore can be thermally cured at a sulfuric acid concentration of about 1,300 g/l, and therefore, the filtration characteristics can be remarkably improved. Accordingly, a highly concentrated uranium pregnant liquor can be recovered at a uranium recovery rate higher than 98%.

(7) When a uranium ore having a high calcium carbonate content is treated according to the process of the present invention, an additional amount of sulfuric acid is first added for consumption by calcium carbonate, but this additional sulfuric acid is effectively utilized as a heat energy source for the thermal curing because it contributes to generation of the dilution heat and reaction heat.

(8) Since the process steps of the present invention are very simple, plant construction costs as calculated by way of a feasibility study are smaller by 30 to 40% than the construction costs for the conventional process plants, and operation costs are lower by at least 30% than in the conventional processes.

(9) According to the process of the present invention, operation can be performed very simply and stably, and therefore, automatic processing control instrumentation can be performed very easily.

(10) In the process of the present invention, a large quantity of an ore can be treated for leaching by one set of apron feeder type apparatus. The present invention can therefore be broadly utilized to extract metal components from not only uranium ores but also other non-ferrous ores such as copper, nickel and vanadium ores. Further, the process of the present invention can be effectively utilized for recovery of uranium from slag formed in the smelting of copper and gold ores, recovery of uranium from phosphate rocks and the treatment of low grade uranium ores.

What is claimed is:

1. A process for the continuous leaching of ores for continuously leaching out and extracting metal components contained in the ore, which comprises:

(A)
 (1) continuously forming a plurality of layers of pulverized ore,
 (2) continuously moving each of said layers in sequence through a sprinkling zone, a laminating zone and a self-sustaining thermal curing zone,
 (3) continuously and uniformly sprinkling a metal component extracting solvent selected from the group consisting of an acid, an alkali solvent and an organic solvent on the surface of each of said layers as the layers move through said sprinkling zone, said layers being of sufficient thickness to form in each unit layer a uniform mixture of the pulverized ore and solvent,
 (4) continuously laminating the so-sprinkled unit layers in said laminating zone, and
 (5) allowing the ore in said laminated layers to become thermally cured utilizing the exothermic heat generated in situ as the laminated layers move through said thermal curing zone; and (B)
 (1) repulping thermally cured laminated layers recovered from said thermal curing zone, and
 (2) subjecting the repulped material to solid-liquid separation to recover a pregnant liquor containing the extracted metal component.

2. The process according to claim 1, in which the formation of a plurality of layers of pulverized ore, sprinkling of a solvent, laminating the unit layers and thermal curing are conducted on a fixed bed by means of a continuously moving ore-metering device.

3. The process according to claim 1, in which the pulverized ore is selected from the group consisting of uranium, copper, nickel and vanadium ores.

4. The process according to claim 1, in which the pulverized ore is selected from the group consisting of slag formed in the smelting of copper and gold ores, phosphate rocks and low grade uranium ores, and the metal component extracted from said ore is uranium.

5. The process of claim 1, in which the solvent is selected from the group consisting of sulfuric acid hydrochloric acid, nitric acid, phosphoric acid, sodium carbonate, ammonium carbonate, ammonia and amines.

6. The process according to claim 1, in which the thickness of a unit layer is from 1 to 20 cm, and the thickness of the laminated unit layers is from 2 to 10 meters.

7. The process according to claim 1, in which the particle size of the pulverized ore is from 0.4 mm to 2.0 mm.

8. The process according to claim 1, in which the reaction heat generated due to contact of the ore with the solvent and the hydration heat generated due to dilution of the solvent with water contained in the ore are stored and used for said thermal curing of the ore.

9. The process according to claim 1, in which said ore is uranium ore and said solvent is concentrated sulfuric acid.

10. The process according to claim 9, in which the thermal curing time is from 10 minutes to 3 hours.

11. The process according to claim 9, in which the thermal curing temperature is from 90° to 120° C.

12. The process according to claim 9, in which the concentration of sulfuric acid is from 600 to 1400 g/liter $H_2SO_4$ due to hydration of the acid with water contained in the ore and from 40 to 150 liter of the acid is used.

* * * * *